(12) United States Patent
Takaishi et al.

(10) Patent No.: US 8,179,088 B2
(45) Date of Patent: May 15, 2012

(54) NONCONTACT TRANSMISSION DEVICE (75) Inventors: Konomu Takaishi, Osaka (JP); Kazunori Nohara, Zama (JP)

(73) Assignees: Aska Electron Corporation, Osaka (JP); Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 544 days.

(21) Appl. No.: 12/516,809

(22) PCT Filed: Nov. 29, 2007

(86) PCT No.: PCT/JP2007/073050
§ 371 (c)(1),
(2), (4) Date: May 29, 2009

(87) PCT Pub. No.: WO2008/066110
PCT Pub. Date: Jun. 5, 2008

(65) Prior Publication Data
US 2010/0001847 A1    Jan. 7, 2010

(30) Foreign Application Priority Data
Nov. 30, 2006   (JP) ................................. 2006-323347

(51) Int. Cl.
*H01M 10/46*   (2006.01)
(52) U.S. Cl. ....................... 320/107; 320/108
(58) Field of Classification Search .................. 320/107, 320/108
See application file for complete search history.

(56) References Cited

U.S. PATENT DOCUMENTS

| 5,883,920 A | 3/1999 | Maruyama et al. |
| 7,310,245 B2 * | 12/2007 | Ohbo .......................... 363/21.02 |
| 7,923,870 B2 * | 4/2011 | Jin ................................ 307/140 |

FOREIGN PATENT DOCUMENTS

| JP | 2689927 A | 8/1997 |
| JP | 11-338984 A | 12/1999 |
| JP | 2000-166129 A | 6/2000 |
| JP | 2003018757 A | 1/2003 |
| JP | 2006-060909 A | 3/2006 |
| JP | 2006-230032 A | 8/2006 |

OTHER PUBLICATIONS

Notification Concerning Transmittal of International Preliminary Report on Patentability from PCT/JP2007/073050, dated Jun. 11, 2009 (10 pages).

(Continued)

*Primary Examiner* — Reena Aurora
(74) *Attorney, Agent, or Firm* — Osha • Liang LLP (57) ABSTRACT

A noncontact transmission device 100 is provided with a driver 106 for driving a coil 102; a system clock oscillator 110 for outputting a system clock; a monitoring clock oscillator 112 for outputting a monitoring clock LF0 having a frequency lower than that of the system clock CK0; and a control circuit 108. The control circuit 108 outputs a system clock oscillating control signal S60 based on the monitoring clock LF0 while being in a standby state and makes the system clock oscillator 110 intermittently output a system clock CK0 in synchronization with the control signal S60. In a period when the system clock CK0 is being outputted, the coil 102 is driven by a driver control signal SD and whether the device 200 to which data is to be transmitted is arranged or not is detected.

2 Claims, 4 Drawing Sheets

OTHER PUBLICATIONS

Korean Office Action for Application No. 2009-7011032, mailed on Nov. 30, 2010 (5 pages).
esp@cenet Patent Abstract for Japanese Publication No. 2003018757, publication date Jan. 17, 2003. (1 page).
International Search Report w/translation from PCT/JP2007/073050 dated Jan. 8, 2008 (2 pages).
Written Opinion from PCT/JP2007/073050 dated Jan. 8, 2008 (3 pages).
espacenet Abstract JP2000166129A; Publication dated Jun. 16, 2000; Sanyo Electric Co. (1 page).
espacenet Abstract JP11338984A; Publication Dated Dec. 10, 1999; Matsushita Electric Industrial Co., Ltd. (1 page).
espacenet Abstract JP8163080A; Publication Date: Jun. 21, 1996; Nippon Electric Co. (1 page).
espacenet Abstract JP2006060909A; Publication Date Mar. 2, 2006; Seiko Epson Corp. (1 page).
espacenet Abstract JP2006230032A; Publication Date Aug. 31, 2006; Daiho Noboru (1 page).
Chinese Office Action for Application No. 200780043479.5, mailed on Apr. 7, 2011 (5 pages).

* cited by examiner

NONCONTACT TRANSMISSION DEVICE

TECHNICAL FIELD

The present invention relates to a noncontact transmission device which transmits at least one of electric power and a data signal to a device to which at least one of the electric power and the data signal is to be transmitted, by means of electromagnetic coupling via a coil.

BACKGROUND ART

One method used for charging a built-in rechargeable battery in a piece of electrical equipment is a so-called noncontact power transmission method, in which electric power is transmitted from a battery charger by means of electromagnetic coupling (also referred to as dielectric coupling) by means of a coil. Further, there has been known a structure of a battery charger of this type in which power transmission is started after confirmation of whether or not a piece of electrical equipment (i.e. a load) appropriately placed on the battery charger is authorized equipment.

Documents concerning the background art of the present application include JP 2006-230032 A, JP 2006-60909 A, and JP 2689927 B.

There are cases in which a battery charger remains connected to a commercial power source even during a standby period in which a piece of electric equipment is not placed. In this case, the battery charger continues to consume power even during the standby period. Meanwhile, it is possible to suppress power consumption by connecting the battery charger to a commercial power source only when charging is required. In the latter case, however, the battery charger must be connected to the commercial power source each time charging is started, which is burdensome and inconvenient. Here, although the example case of electric power transmission has been described above, similar circumstances can be identified in the case of transmission of a data signal by means of electromagnetic coupling via a coil.

The object of the present invention is to provide a noncontact transmission device for transmitting at least one of electric power and a data signal to a device to which at least one of the electric power and the data signal is to be transmitted, by means of electromagnetic coupling via a coil, which can suppress standby electric power and eliminate the inconvenience of connecting the transmission device to a commercial power source each time charging is required.

DISCLOSURE OF THE INVENTION

According to an aspect of the invention, there is provided a noncontact transmission device which transmits at least one of electric power and a data signal to a device to which at least one of the electric power and the data signal is to be transmitted, by means of electromagnetic coupling via a coil, the noncontact transmission device including a driver which drives the coil; a system clock oscillator which outputs a system clock; a monitoring clock oscillator which outputs a monitoring clock having a frequency lower than that of the system clock; and a control circuit which operates by use of the system clock and the monitoring clock and outputs a control signal for the driver and a control signal for the system clock oscillator, wherein, during a standby period prior to start of transmission of at least one of the electric power and the data signal, the control circuit outputs the control signal for the system clock oscillator based on the monitoring clock to cause the system clock oscillator to intermittently output the system clock in synchronization with the control signal for the system clock oscillator, and, during a period in which the system clock is being output, drives the coil by the control signal for the driver in order to detect whether or not the device to which at least one of the electric power and the data signal is to be transmitted is placed. Preferably, the period in which the system clock is being output is set to a time period which is required for the detection.

With the above structure, during the standby period, the transmission device operates intermittently to detect the device to which electric power or the like is to be transmitted. This structure allows suppression of the standby power even in a case where the transmission device remains connected to the commercial power source and also allows elimination of inconvenience of connecting the transmission device with the commercial power source each time charging is necessary. Also, because a monitoring clock having a frequency lower than that of a system clock is used for timing control of the intermittent operation and the system clock itself is used in a limited manner at the time of the intermittent operation, the standby power can be further suppressed.

BRIEF DESCRIPTION OF THE DRAWINGS

These and other objects of the invention will be explained below by reference to the accompanying drawings, in which.

BEST MODE FOR CARRYING OUT THE INVENTION

Figure 1:
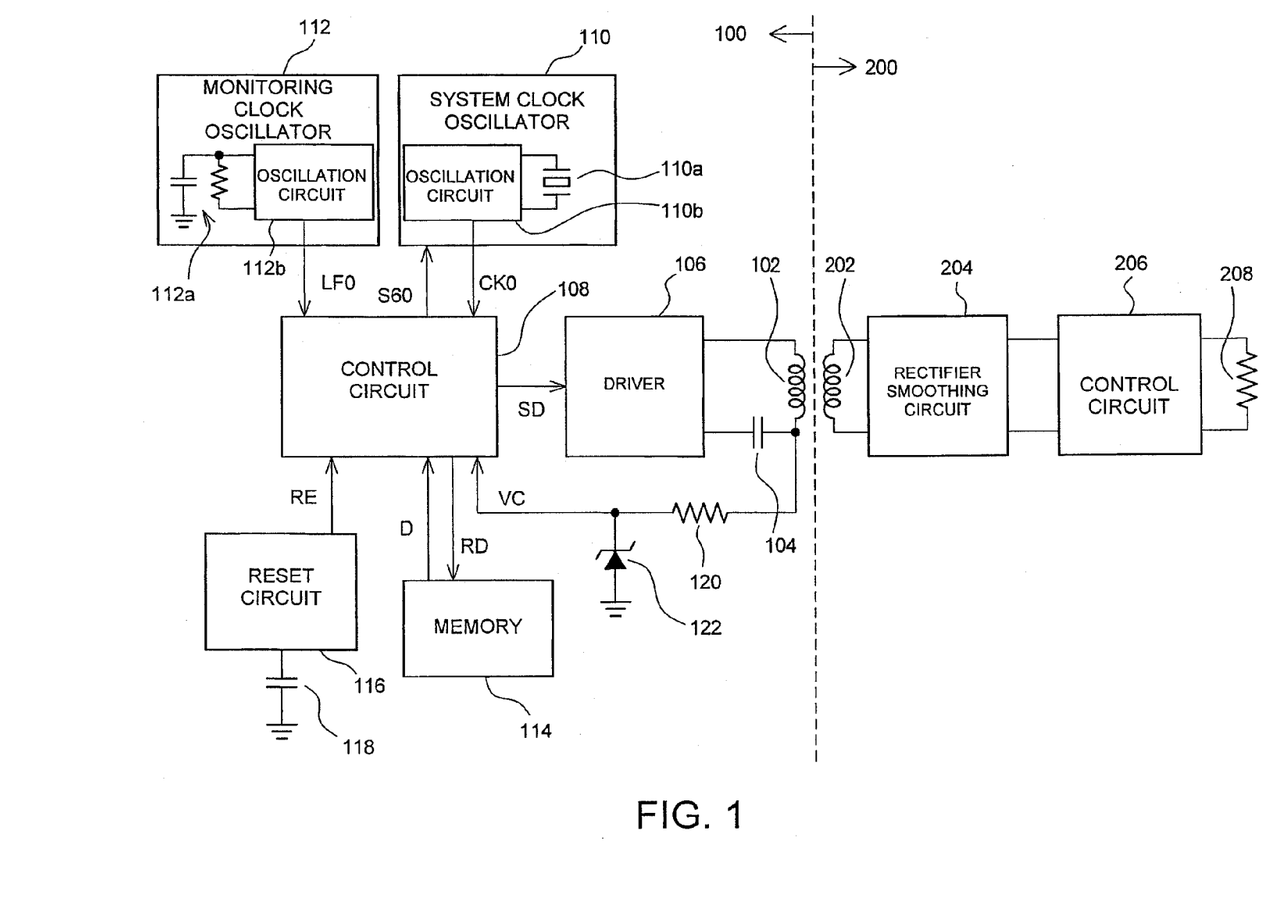
FIG. 1 is a block diagram for explaining an example transmission device according to an embodiment of the present invention.

FIG. 1 shows a block diagram for explaining an example of a transmission device 100 according to an embodiment of the present invention. The transmission device 100 transmits at least one of an electric power and a data signal to a device 200 to which at least one of electric power and a data signal is to be transmitted. For ease of explanation, FIG. 1 also shows an example of the device 200. Here, transmission of electric power and so on is achieved by a noncontact transmission method which is executed by electromagnetic induction in a state in which the transmission device 100 and the device 200 are electromagnetically coupled with each other. It should be noted that although in this embodiment the device 200 is any of a variety of types of electric equipment and the transmission device 100 is a battery charger for the various types of electric equipment, these devices 100 and 200 are not limited to these examples.

The transmission device 100 includes a coil 102, a capacitor 104, a driver 106, a control circuit 108, a system clock oscillator 110, a monitoring clock oscillator 112, a memory 114, a reset circuit 116, a capacitor 118, a resistor 120, and a Zener diode 122.

The coil 102 is electromagnetically coupled with a coil 202 of the device 200 to enable transmission of electric power and so on via the coils 102 and 202. Here, the coil 102, which can be configured by a planar air-core coil, may also be configured by other structures. One end of the coil 102 is connected with the driver 106 and the other end of the coil 102 is connected with the driver 106 via the capacitor 104. By means of the coil 102 and the capacitor 104, a voltage signal supplied from the driver 106 to the coil 102 is alternated (converted to alternating current) and boosted.

Figure 2:
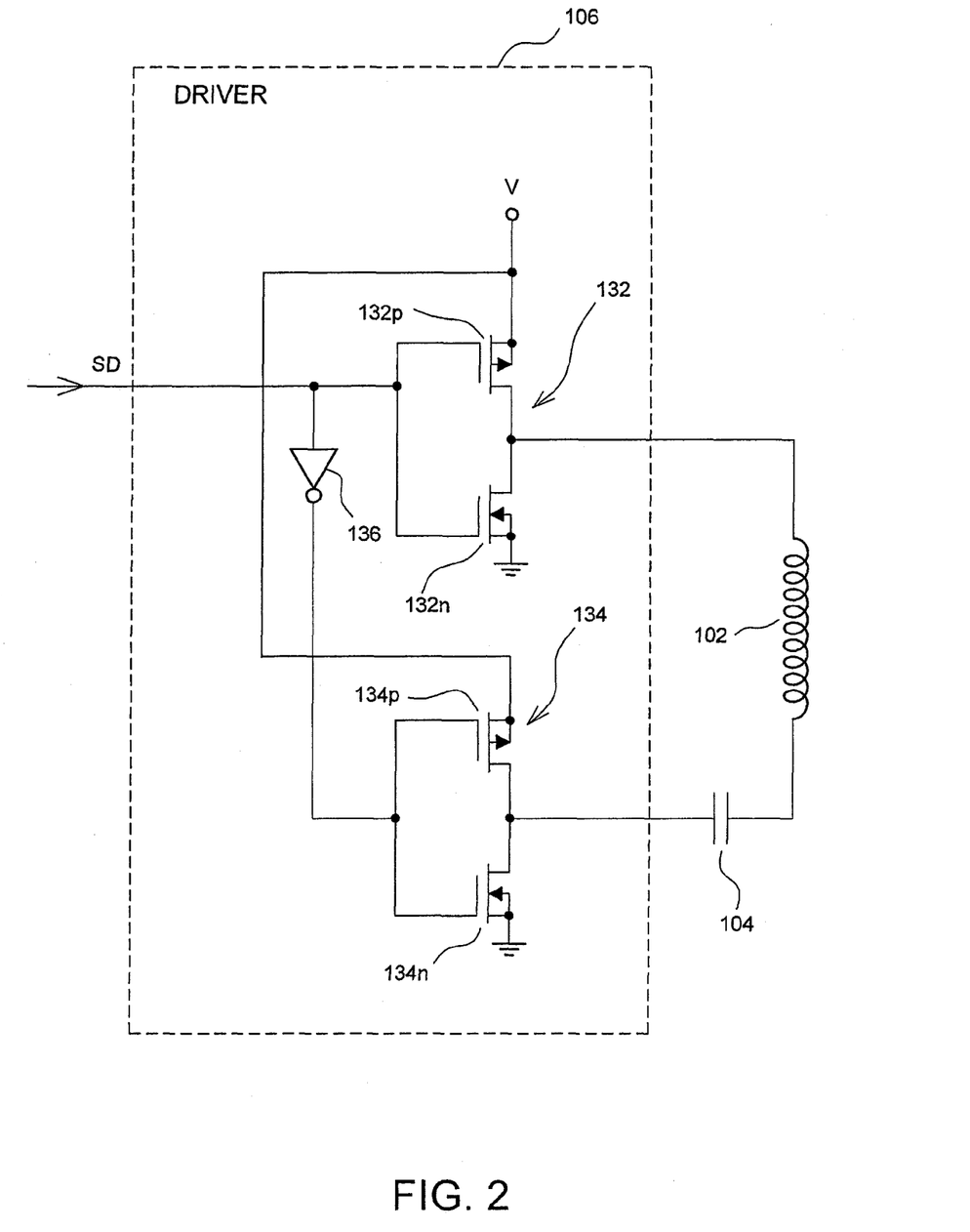
FIG. 2 is a circuit diagram for explaining an example driver of the transmission device according to the embodiment of the present invention.

The driver 106 is a circuit which supplies a voltage to the coil 102. In other words, the driver 106 is a circuit for driving the coil 102. FIG. 2 shows an example structure of the driver 106. It should be noted that, for ease of explanation, FIG. 2 also shows the coil 102 and the capacitor 104. In this example, the driver 106 is formed from a C-MOS (Complementary-Metal Oxide Semiconductor) circuit 132, a CMOS circuit 134, and an inverter 136.

The CMOS circuit 132 is formed by a P-channel MOSFET (Metal Oxide Semiconductor Field Effect Transistor) 132$p$ and an N-channel MOSFET 132$n$ which are connected in series with each other between a power source voltage V and a ground potential. A drain of the MOSFET 132$p$ and a drain of the MOSFET 132$n$ (which are connected with each other) are connected with one end of the coil 102. A driver control signal SD output from the control circuit 108 is commonly input to a gate of the MOSFET 132$p$ and a gate of the MOSFET 132$n$. Here, the power source voltage V is generated by converting a commercial alternating current power source into a direct current power source by means of an unillustrated AC adaptor (AC-DC converter), for example. The AC-adaptor may be provided within the transmission device 100 or may be provided externally to the transmission device 100.

The CMOS circuit 134 is formed by a P-channel MOSFET 134$p$ and an N-channel MOSFET 134$n$ which are connected in series with each other between the power source voltage V and the ground potential. A drain of the MOSFET 134$p$ and a drain of the MOSFET 134$n$ (which are connected with each other) are connected with the other end of the coil 102 via the capacitor 104. The driver control signal SD output from the control circuit 108 is commonly input to a gate of the MOSFET 134$p$ and a gate of the MOSFET 134$n$.

With the above structure, when the level of the driver control signal SD is H (High), the MOSFETs 132$n$ and 134$p$ are turned ON. In contrast, when the driver control signal SD is at an L (Low) level, the MOSFETs 132$p$ and 134$n$ are turned ON. When transmitting electric power from the transmission device 100 to the device 200 to which the electric power is to be transmitted, with the repetition of H level and L level of the driver control signal SD in an alternating manner, an alternating current voltage is applied to the coil 102. When transmitting various data signals from the transmission device 100 to the device 200 to which various data signals are to be transmitted, meanwhile, with the modulation of the pulse width or the period of H level and L level of the driver control signal SD, a voltage in accordance with the transmission data is applied to the coil 102.

The control circuit 108 includes a logic circuit which receives a system clock (also referred to as a master clock) supplied from the system clock oscillator 110 and a monitoring clock LF0 supplied from the monitoring clock oscillator 112 and uses these clocks CK0 and LF0 to operate. The control circuit 108 generates the driver control signal SD, which is then output to the driver 106, for example. The control circuit 108 will be described in further detail below.

The system clock oscillator 110 is formed by including, for example, a crystal oscillator 110$a$ and an oscillation circuit 110$b$ connected with the crystal oscillator 110$a$. Here, a ceramic oscillator and so on may be used in place of the crystal oscillator. The oscillation circuit 110$b$ causes the crystal oscillator 110$a$ to operate in a stable manner and transforms the output of the crystal oscillator 110$a$ into a rectangular pulse, for example, and outputs the rectangular pulse as a system clock CK0. The frequency of the system clock CK0 is 32 MHz, for example. The system clock oscillator 110 is provided such that the system clock CK0 can be supplied to the control circuit 108. As will be described below, the transmission device 100 is configured such that supply of the system clock CK0 can be controlled by a clock supply control signal S60 supplied from the control circuit 108.

The monitoring clock oscillator 112 generates and outputs a clock LF0 having a frequency of 250 kHz, for example, which is lower in frequency than the system clock CK0. The monitoring clock oscillator 112 is formed from, for example, an RC oscillation circuit 112$a$ formed of a resistor and a capacitor and an oscillation circuit 112$b$ connected to the RC oscillation circuit 112$a$. The oscillation circuit 112$b$ causes the RC oscillation circuit 112$a$ to operate in a stable manner and transforms the output of the RC oscillation circuit 112$a$ into a rectangular pulse, for example, and outputs the rectangular pulse as a monitoring clock LF0. The monitoring clock oscillator 112 is provided such that the monitoring clock LF0 can be supplied to the control circuit 108.

The memory 114 is provided such that the control circuit 108 can access the memory 114, and is configured to send the predetermined information D which is stored in the memory 114 to the control circuit 108 in accordance with a read-out command RD from the control circuit 108, for example. The memory 114 is formed by a non-volatile memory such as a mask ROM (Read Only Memory) or EEPROM (Electronically Erasable and Programmable Read Only Memory). Examples of the information D stored in the memory 114 include the frequencies of the H level and L level of the driver control signal SD; i.e. the driving frequency of the coil 102.

The reset circuit 116 resets the control circuit 108 as a whole. Specifically, the control circuit 108, upon receiving a reset signal RE from the reset circuit 116, reboots itself. The reset circuit 116 is grounded via the capacitor 118.

The resistor 120 includes one end connected to the other end of the coil 102 and the other end grounded via the Zener diode 122 and connected to the control circuit 108. With this structure, a voltage (or an electric current) at the other end of the coil 102 is input, via the resistor 120, to the control circuit 108 as a voltage VC. Here, the resistor 120 and the Zener diode 122 protect the control circuit 108 from excessive input voltage. As will be described below, the voltage VC is utilized for detecting whether or not the transmission device 100 and the device 200 are placed in an electromagnetically coupled state.

The device 200 to which the electric power and the like is to be transmitted is formed by including the coil 202 formed of a planar air-core coil, for example; a rectifier smoothing circuit 204; a control circuit 206; and a load 208. Here, the load 108 is a rechargeable battery, for example. The rectifier smoothing circuit 204 is a circuit which rectifies and smoothes electric power or the like transmitted from the coil 102 to the coil 202, and is formed by including, for example, a diode bridge connected to both ends of the coil 202 and a capacitor connected in parallel to the output of the diode bridge. The load 208 is connected to the output of the diode bridge, for example. Here, for simplification of explanation, the control circuit 206 generally refers to a circuit which performs various control operations in the device 200. The control circuit 206 is configured to allow control of supply of the voltage to the coil 202, for example, and can transmit a data signal to the transmission device 100 via the coils 202 and 102 by means of modulating the voltage. The data signal transmitted to the transmission device 100 includes ID data or the like assigned to the device 200, for example.

Figure 3:
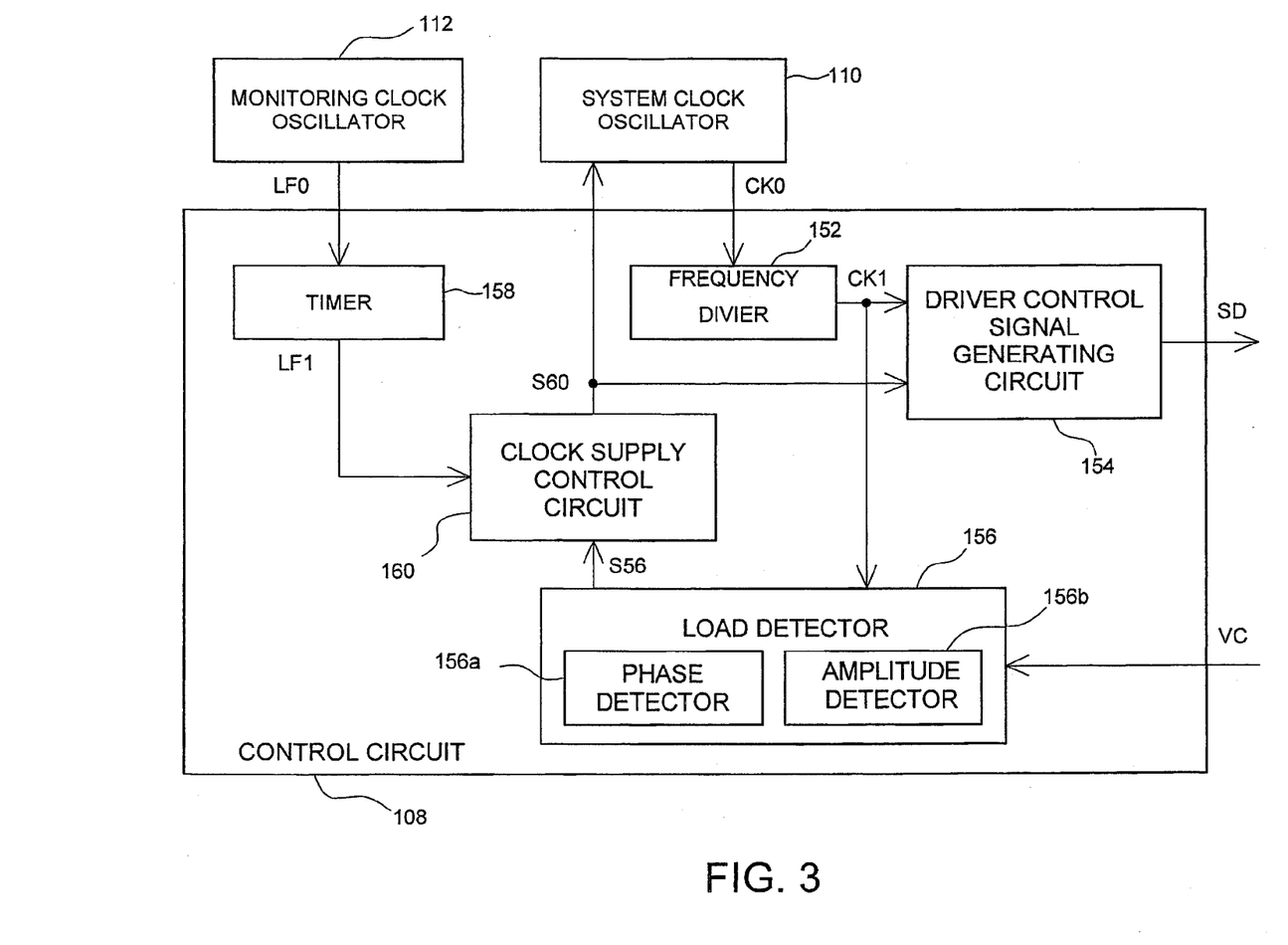
FIG. 3 is a block diagram for explaining an example control circuit of the transmission device according to the embodiment of the present invention.
Figure 4:
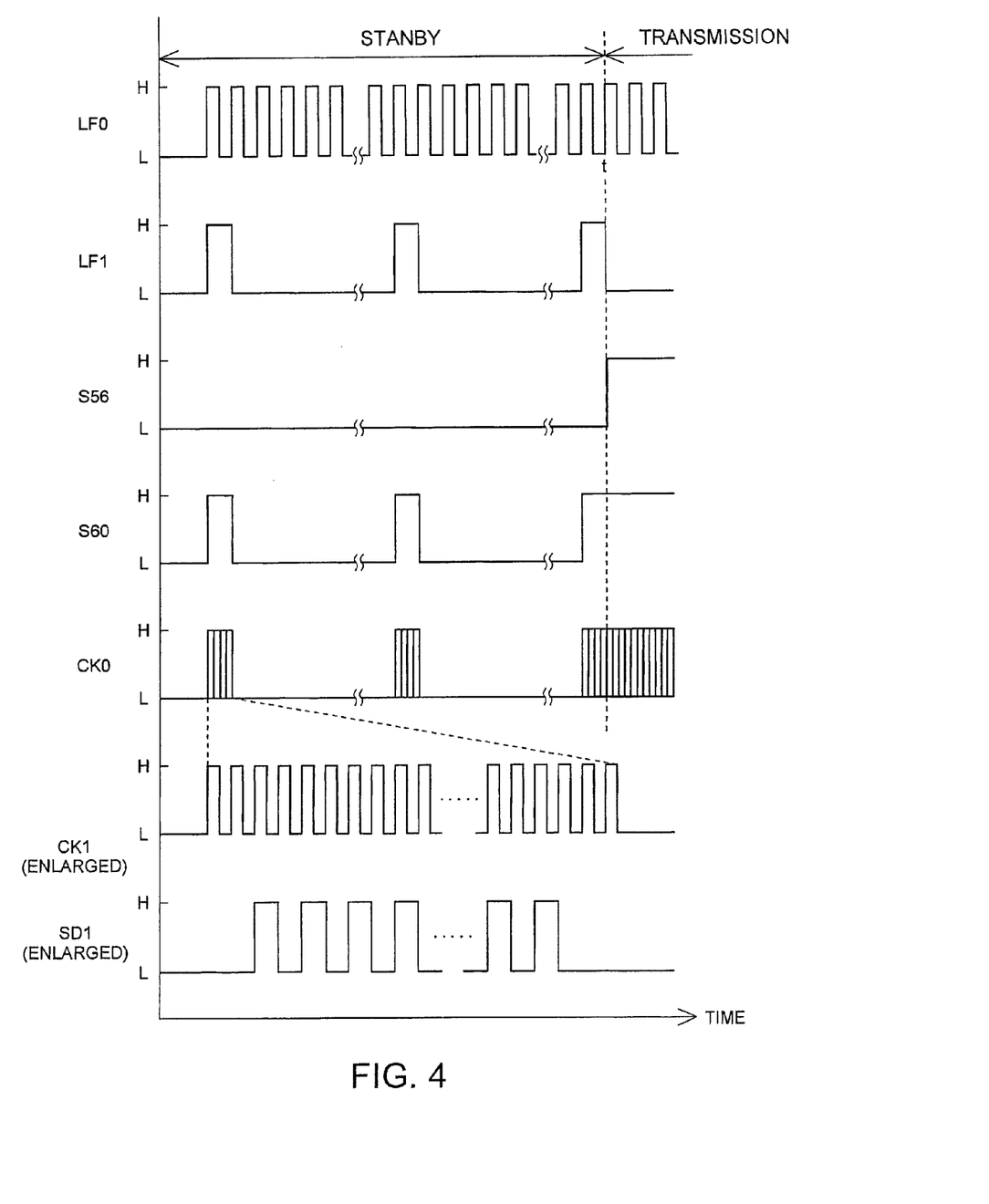
FIG. 4 is a timing chart for explaining an example operation of the transmission device according to the embodiment of the present invention.

FIG. 3 shows an example structure of the control circuit 108. Here, for ease of explanation, FIG. 3 also shows the system clock oscillator 110 and the monitoring clock oscillator 112. Further, FIG. 4 shows a timing chart for explaining an example operation of the transmission device 100.

In the example shown in FIG. 3, the control circuit 108 includes a frequency divider 152, a driver control signal generating circuit 154, a load detector 156, a timer 158, and a clock supply control circuit 160. Here, these elements 152, 154, 156, 158, and 160 may be formed by a logic circuit, and the control circuit 108 can be formed as a logic IC (Integrated Circuit) component.

The frequency divider 152 receives the system clock CK0 which is supplied, and applies frequency division to the system clock CK0 to generate a clock CK1 having a frequency of several hundred kHz, for example. For example, information D concerning the frequency division value may be stored in the memory 114 (see FIG. 1). In this case, the transmission device 100 can be configured such that the frequency divider 152 obtains the information D at the time of actuation of the transmission device 100 and uses the thus-obtained information D to generate the clock CK1. In this example, the clock CK1 is output to the driver control signal generating circuit 154 and the load detector 156.

The driver control signal generating circuit 154 operates by using the clock CK1 to generate a driver control signal SD. For example, information D concerning the driver control signal SD may be stored in the memory 114. In this case, the transmission device 100 can be configured such that the driver control signal generating circuit 154 obtains the information D at the time of actuation of the transmission device 100 and uses the thus-obtained information D to generate the control signal SD. In this example, the driver control signal SD is output to the driver 106 (see FIG. 1).

The load detector 156 detects whether or not the transmission device 100 and the device 200 are placed in an appropriate electromagnetic coupled state, and generates a detection result signal S56.

The above detection can be achieved by reference to variation in the relationship between the phase of the clock CK1 and the phase of the voltage VC, for example, between the state in which the device 200 is in an appropriate electromagnetically coupled state with the transmission device 100 (i.e. a normal load state) and other states. For example, the phase of the voltage VC is identical with the phase of the clock CK in the normal load state, whereas the phase of the voltage VC is delayed with respect to the phase of the clock CK1 in a state in which the device 200 is not electromagnetically coupled with the transmission device 100 (i.e. a non-load state). Accordingly, the load detector 156 can detect whether or not the normal load state is established, by comparing the phase of the clock CK1 with the phase of the voltage VC. Alternatively, the above detection can also be achieved by using the amplitude of the voltage VC, for example. For example, because, in the normal load state, resonance is generated via the coils 102 and 202 and the amplitude of the voltage VC is increased as compared with that in the non-load state, it is possible to detect whether or not the normal load state is established by comparing the amplitude of the voltage VC with a predetermined reference voltage. Here, because, in a state in which a conductive object other than the device 200 is placed close to the coil 102 (i.e. a foreign material loaded state), both the phase and the amplitude of the voltage VC differ from those in the normal load state and the non-load state, the foreign material loaded state can be detected. In addition, it is also possible to determine the normal load state by using the ID data assigned to the device 200.

FIG. 3 shows an example case in which the load detector 156 is formed by a phase detector 156a for the above phase comparison and an amplitude detector 156b for the above amplitude comparison. In this case, as the load detector 156 can generate the detection result signal S56 based on the detection results obtained by both the detectors 156a and 156b, high detection accuracy can be achieved. In this example, the detection result signal S56 shows a waveform which is at H level when the normal load state is determined and which is at L level when the normal load state is not determined (see FIG. 4). In this example, the detection result signal S56 is output to the clock supply control circuit 160. Here, the load detector 156 can be formed from only one of the phase detector 156a and the amplitude detector 156b. Further, information D concerning the comparison reference value for use by the detectors 156a and 156b may be stored in the memory 114. In this case, the transmission device 100 can be configured such that the load detector 156 obtains the information D at the time of actuation of the transmission device 100, for example, and uses the information D for detection operation.

The timer 158 receives the monitoring clock LF0 supplied thereto, and uses the monitoring clock LF0 to generate a timer signal LF1. In this example, the time signal LF1 has a waveform which intermittently changes (transits) to H level which remains for a predetermined time width (see FIG. 4). In the timer signal LF1, the period of the H level is 250 ms (milliseconds), for example, and the pulse width of the H level is 128 µs (microseconds), for example. Information D concerning the period and the pulse width described above may be stored in the memory 114. In this case, the transmission device 100 can be configured such that the timer 158 obtains the information D at the time of actuation of the transmission device 100 and uses the thus-obtained information D to generate the timer signal LF1. In this example, the timer signal LF1 is output to the clock supply control circuit 160.

The clock supply control circuit 160 receives the detection result signal S56 and the timer signal LF1 supplied thereto, and generates a clock supply control signal S60 based on the signal S56 and LF1. The clock supply control signal S60 is a signal which discriminates between a case in which at least one of the detection result signal S56 and the timer signal LF1 is at H level and other cases, and, in this example, represents a waveform which changes to H level when at least one of the signals S56 and LF1 is at H level (see FIG. 4). When the signals S56, LF1, and S60 have the waveforms as described in the above example, the clock supply control circuit 160 can be formed by an OR circuit (logical sum circuit) using the signals S56 and LF1 as input signals, for example, and outputting the clock supply control signal S60 as an output signal. The clock supply control signal S60 is output to the system clock oscillator 110 and the driver control signal generating circuit 154.

The clock supply control signal S60 corresponds to an enable signal of the system clock oscillator 110 and the driver control signal generating circuit 154. In this example, during a period in which the clock supply control signal S60 is at the H level, the system clock oscillator 110 and the driver control signal generating circuit 154 operate.

The system clock oscillator 110 is configured such that output of the system clock CK0 can be controlled by the clock supply control signal S60. Such an output control can be accomplished by, for example, providing a switching element such as a MOSFET along the power source supply path to the system clock oscillator 110 and using the clock supply control signal S60 for opening and closing (ON and OFF) of the switching element. Alternatively, the switching element such as a MOSFET may be provided between the crystal oscillator 110a and the oscillation circuit 110b, or on the output path of the system clock oscillator 110.

With the above structure, when the detection result signal S56 is at L level (see the time period prior to time t in FIG. 4); i.e. when a normal load state is not established, the transmission device 100 is in a standby state. During this standby state, the transmission device 100 intermittently detects the device 200. In the example shown in FIG. 4, during the standby state, the clock supply control circuit 160 intermittently raises the level of the clock supply control signal S60 to H level in synchronization with the timer signal LF1, and the system clock oscillator 110, in synchronization with this transition to the H level, intermittently outputs the system clock CK0. During the period in which the system clock CK0 is being supplied, the driver control signal generating circuit 154 outputs the driver control signal SD to the driver 106, which supplies a voltage to the coil 102. Further, during the period in which the system clock CK0 is being supplied, the load detector 156 operates to perform the load detection described above. The load detection is performed 4 times per second, for example. In this case, the period of the H level of the timer signal LF1 is 250 ms, for example.

Here, in order to perform the phase detection and the amplitude detection as described above, it is necessary to obtain a change in the voltage VC (a change of waveform). Because the change in the voltage VC is affected by the delay due to the coil 102 and the capacitor 104, in this example, during the period in which the system clock CK0 is being output, the pulse width of the H level of the timer signal LF1 is set to a time required for the load detection, which is 128 µs, for example.

If the normal load state is detected by the intermittent load detection, the transmission device 100 starts transmission of electric power and so on (see the time period after t in FIG. 4). More specifically, the detection result signal S56 rises to H level, and the clock supply control signal S60 continues to be at H level irrespective of the state of the timer signal LF1. Consequently, the system clock CK0 is continuously output from the system clock oscillator 110, and the driver control signal generating circuit 154 and so on operate continuously so that transmission of electric power or the like is performed.

With the intermittent operation described above, the power consumption during the standby period can be suppressed even when the transmission device remains connected to the commercial power source. Also, as the transmission device remains connected to the commercial power source, there can be eliminated the inconvenience of connecting the transmission device to the power source each time charging is required.

Suppression of the standby power will be described. In an example in which the control circuit 108 is formed of a CMOS logic of a 3.3V voltage system and a system clock of 32 MHz is used, the power consumption of the control circuit 108 during the standby period can be reduced to 10 mW or less with the intermittent driving, as compared with approximately 200 mW consumed when the intermittent driving is not performed. Here, the power consumption of the driver 106 depends on the size of the coil 102; i.e., the transmission power.

Here, in order to increase the transmission efficiency of the electric power and so on, the system clock preferably has a stable precision and a higher frequency. This is because fine adjustment of the driving frequency of the coil can be achieved by adjustment of the division value of the frequency divider in accordance with the inductance value, for example. Further, a stable system clock with a high frequency allows an increase in the precision in the load detection, reception of ID from the device to which data are to be transmitted, recognition of the ID, and so on. On the other hand, because the power consumption in the semiconductor device such as an integrated circuit is in proportion to the frequency of the system clock, the power consumption of the transmission device increases with the frequency of the system clock. As such, highly efficient transmission and increased precision of load detection or the like are in a trade-off relationship with respect to reduction in power consumption. In this case, in the transmission device having a structure in which a system clock is operated continuously, while the power consumption by the driver occupies a high ratio of the power consumption of such a transmission device during the transmission of electric power and so on, a reduction in the power consumption of such a transmission device is in a trade-off relationship with the increase in the precision of the load detection during the standby period.

In the transmission device 100 according to the embodiment of the present invention, on the other hand, even when high frequencies are achieved for the system clock CK, an increase in power consumption can be suppressed by the above intermittent operation. It is therefore possible to achieve highly efficient transmission, increased load detection precision, and so on, while suppressing power consumption.

Further, in general, the higher the oscillation frequency, the greater the power consumption of the oscillator itself. However, the transmission device 100 according to the embodiment of the present invention, in which the system clock CK0 itself is used limitedly for the intermittent operation, can achieve reduced power consumption as compared with the case where the system clock oscillator 110 itself is driven intermittently to operate continuously. In addition, because the frequency of the monitoring clock LF0 for use in the timing control of the intermittent operation is lower than that of the system clock CK0, even if the monitoring clock oscillator 112 is operated continuously, the power consumption in this case is less than that when the system clock oscillator is operated continuously.

Moreover, as it is not necessary to make the monitoring clock LF0 synchronized with the system clock CK0, only a few restrictions result from the consistency of the whole system. Consequently, the monitoring clock oscillator 112 and the timer 158 may have lower operation precision, such as oscillation precision, as compared with the system clock oscillator 110 and the frequency divider 152, so that the above intermittent operation can be easily achieved. Also, the circuit scale can be reduced as compared with the structure in which the system clock CK0 is divided to generate the signal LF1.

Here, the waveform which is described above and shown in FIG. 4 is only illustrative and the present invention is not limited to this example. For example, the transmission device 100 may be configured to employ a waveform in which the H level and L level described above are reversed or assume any waveforms other than the rectangular waveform. Further, although FIG. 4 shows an example in which the timer signal LF1 rises in synchronization with the rise of the monitoring clock LF0, there may also be adopted a configuration such that the timer signal LF1 rises in synchronization with the fall of the monitoring clock LF0, which may be similarly applied to other waveforms.

Although in the above example the memory 114 is externally provided, there may also be adopted a configuration such that various types of information D are stored within the control circuit 108.

INDUSTRIAL APPLICABILITY

The present invention is used in a noncontact transmission device which transmits at least one of electric power and a data signal to a device to which at least one of the electric power and the data signal is to be transmitted, by means of electromagnetic coupling via a coil.

The invention claimed is:

1. A noncontact transmission device which transmits at least one of electric power and a data signal to a device to which at least one of the electric power and the data signal is to be transmitted by means of electromagnetic coupling via a coil, the noncontact transmission device comprising:
    a driver which drives the coil;
    a system clock oscillator which outputs a system clock;
    a monitoring clock oscillator which outputs a monitoring clock having a frequency lower than a frequency of the system clock; and
    a control circuit which operates by using the system clock and the monitoring clock and outputs a control signal for the driver and a control signal for the system clock oscillator,
    wherein
    during a standby period prior to start of transmission of at least one of the electric power and the data signal,
    the control circuit outputs the control signal for the system clock oscillator based on the monitoring clock to cause the system clock oscillator to intermittently output the system clock in synchronization with the control signal for the system clock oscillator, and, during a period in which the system clock is being output, drives the coil by the control signal for the driver to detect whether or not the device to which at least one of an electric power and a data signal is to be transmitted is placed.

2. The noncontact transmission device according to claim 1, wherein
    the period in which the system clock is being output is set to a time period which is required for the detection.

* * * * *